United States Patent [19]

Woods et al.

[11] 3,881,423

[45] May 6, 1975

[54] VARIABLE SPEED VEHICLE

[75] Inventors: Harry E. Woods; Gerald L. Woodling, both of Akron; Newton D. Brown, Cuyahoga Falls, all of Ohio

[73] Assignee: The Goodyear Tire & Rubber Company, Akron, Ohio

[22] Filed: Apr. 29, 1974

[21] Appl. No.: 464,845

Related U.S. Application Data

[63] Continuation of Ser. No. 307,579, Nov. 17, 1972, abandoned.

[52] U.S. Cl. .................... 104/25; 104/18; 213/75 R
[51] Int. Cl. ............................................. A63g 1/00
[58] Field of Search ................ 104/18, 20, 25, 183; 213/75 R; 198/110

[56] References Cited
UNITED STATES PATENTS

| | | |
|---|---|---|
| 1,184,241 | 5/1916 | Huston ............................ 213/75 R |
| 3,037,462 | 6/1962 | Barry ................................. 104/18 |
| 3,229,644 | 1/1966 | Cristoof ............................ 104/183 |
| 3,414,134 | 12/1968 | Nealis ............................. 213/75 R |

*Primary Examiner*—M. Henson Wood, Jr.
*Assistant Examiner*—D. W. Keen
*Attorney, Agent, or Firm*—F. W. Brunner; R. P. Yaist; Frederick K. Lacher

[57] ABSTRACT

A variable speed vehicle for a transportation system having a plurality of vehicles connected together in an endless train moving on a continuous track. A cable-reel take-up on the vehicle is actuated by a cam rail on the track to increase or decrease the length of cable between vehicles and provide for acceleration, deceleration or different speeds of the vehicle as it is moved along the track.

7 Claims, 12 Drawing Figures

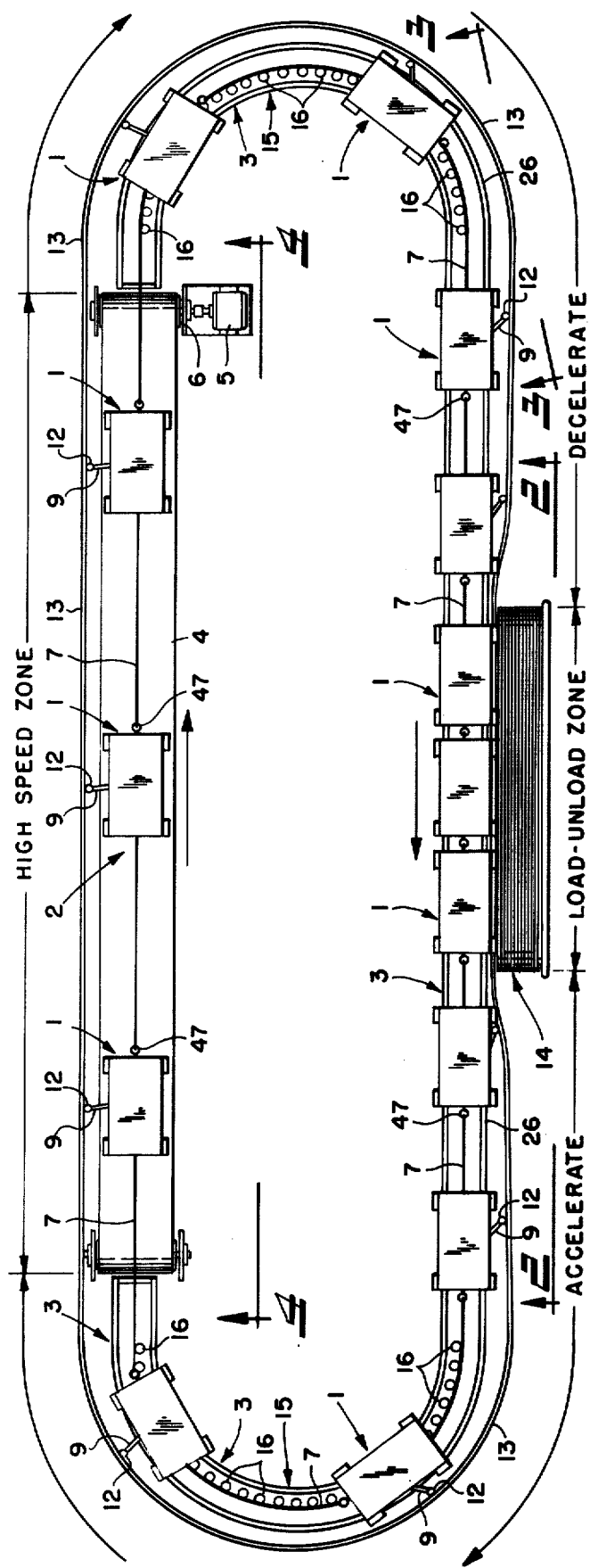
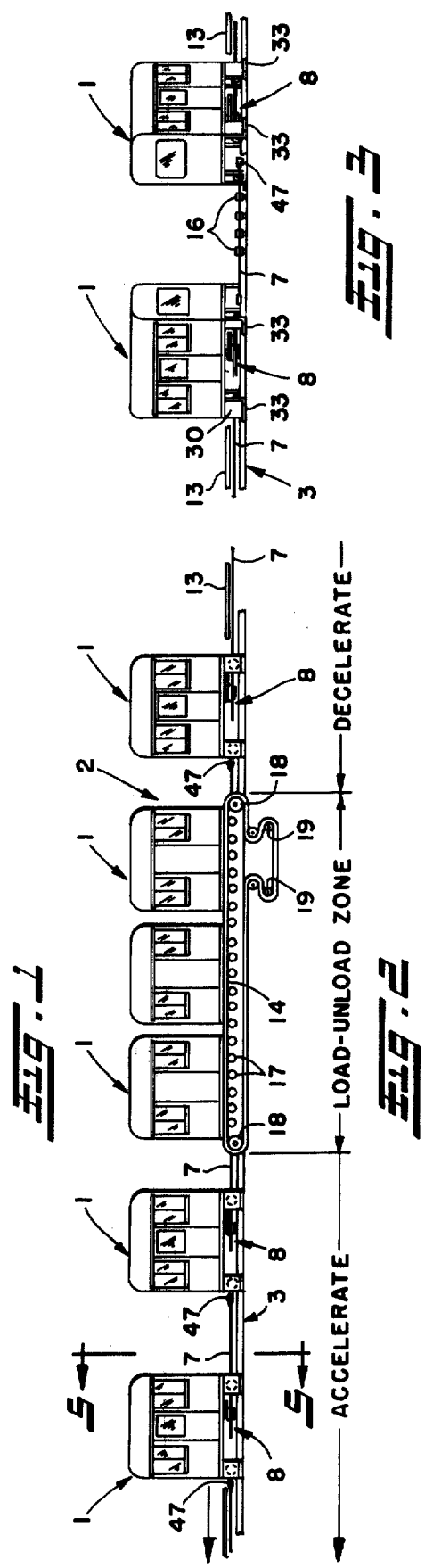

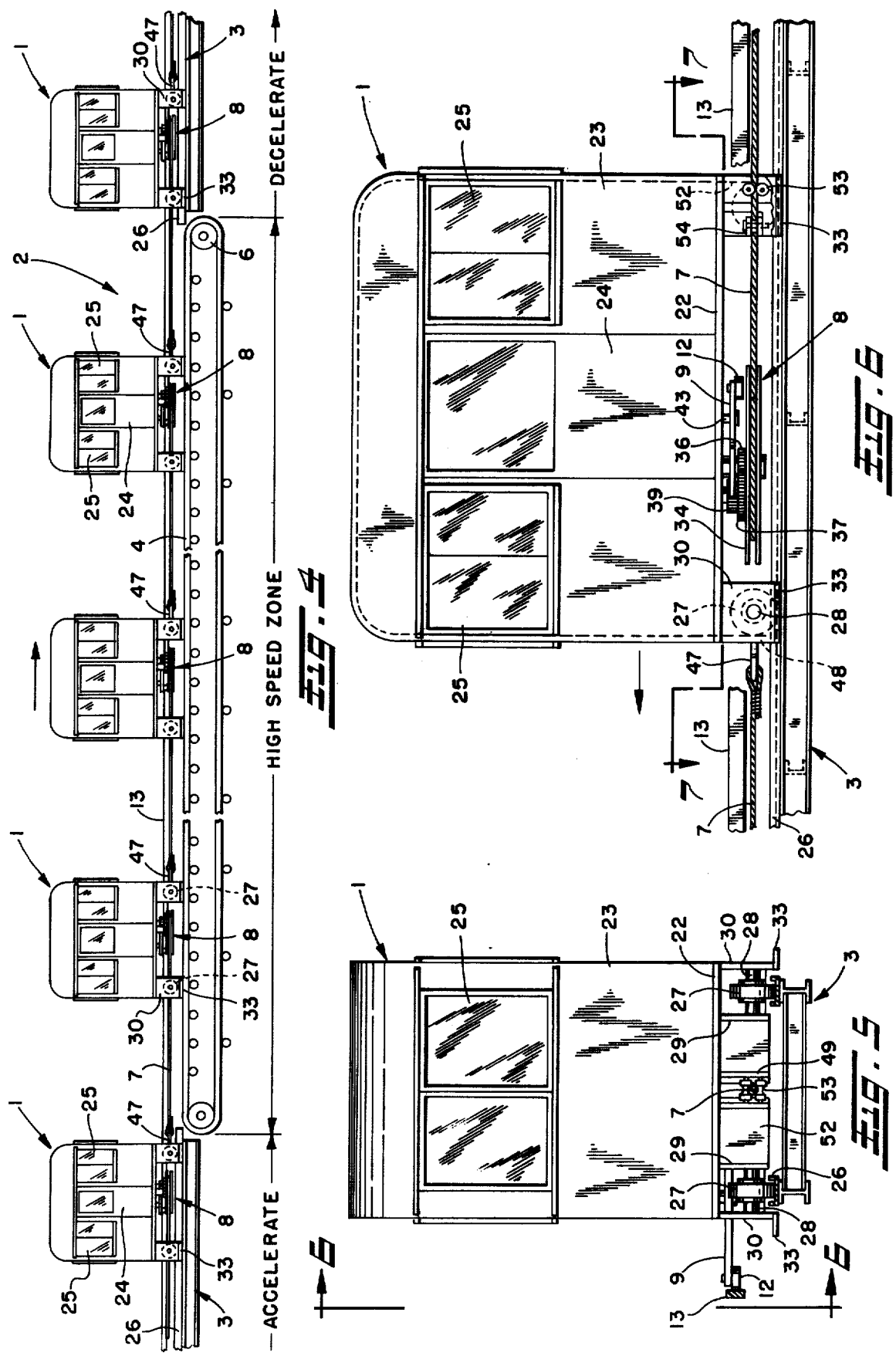

VARIABLE SPEED VEHICLE

This is a continuation of application Ser. No. 307,579, filed Nov. 17, 1972, now abandoned.

This invention relates generally as indicated to a variable speed vehicle for a transportation system in which it is necessary to drive the vehicle at different speeds and to accelerate and decelerate the vehicle between these speeds. For example in a passenger carrying transportation system it is necessary to propel the vehicle at slow speeds in the station areas where passengers are entering and leaving the vehicles and at higher speeds between the station areas.

Heretofore passenger transportation systems of this type have included low speed and high speed belts connected by series of rollers. The speeds of rotation of the rollers have been varied to provide acceleration and deceleration of the vehicles. The initial cost of this type of system is high because of the number of motors and drives required. This also increases the cost of maintenance and replacement of parts. In other passenger transportation systems shown in French Pat. No. 1,578,924, dated Aug. 22, 1969, and Swiss Pat. No. 468,292, dated Mar. 31, 1969, adjacent vehicles have been connected by cables and the cables wrapped around pulleys which are movable toward and away from each other to increase and decrease the length of the cable between the vehicles.

With the foregoing in mind, it is a principal object of this invention to provide a variable speed vehicle having connecting means to another vehicle in a train with reel type take-up means for changing the length of the connecting means between the vehicle and an adjacent vehicle to obtain acceleration, deceleration and different speeds of the vehicle at predetermined portions along the track.

A further object of the invention is to provide a cam rail engageable by a cam follower connected to the take-up means to provide acceleration, deceleration and different speeds of the vehicle at predetermined portions of the track.

A still further object of the invention is to provide for driving the reel through a driven wheel with clutch means for engaging and disengaging the reel.

Another object of the invention is to provide a reel in the shape of a cone drum to vary the rate at which the connecting member is wound on the drum to provide the variance in speed.

Another object of this invention is to provide guide pulleys along the track to maintain the connecting member in a position over the track where the track is curved.

These and other objects of the present invention may be provided through a connecting cable take-up carried by the vehicle. The take-up is actuated by a cam follower in engagement with a cam rail extending along the track to provide the desired action of the take-up at predetermined portions of the track.

To the accomplishment of the foregoing and related ends the invention then comprises the features hereinafter fully described and particularly pointed out in the claims. The following description and the annexed drawings setting forth in detail a certain illustrative embodiment of the invention and two modifications thereof, this being indicative however of but three of the various ways in which the principles of the invention may be employed.

In the annexed drawings:

FIG. 1 is a schematic plan view of a passenger transportation system incorporating a preferred form of mechanism for controlling the acceleration, deceleration and velocity of the vehicle in different zones of the system.

FIG. 2 is a schematic side elevational view of the load-unload zone and the acceleration and deceleration zones taken along the plane of line 2—2 of FIG. 1.

FIG. 3 is a side elevational view like FIG. 2 taken along the plane of line 3—3 of FIG. 1 showing the cable guiding mechanism at a curved portion of the track.

FIG. 4 is a side elevational view like FIG. 2 taken along the plane of line 4—4 of FIG. 1 showing the vehicles and belt drive in the high speed zone.

FIG. 5 is an end elevation of one of the vehicles of the system taken along the plane of line 5—5 of FIG. 2.

FIG. 6 is a sectional view of one of the vehicles taken along the plane of line 6—6 of FIG. 5 parts being broken away.

Figure 7:
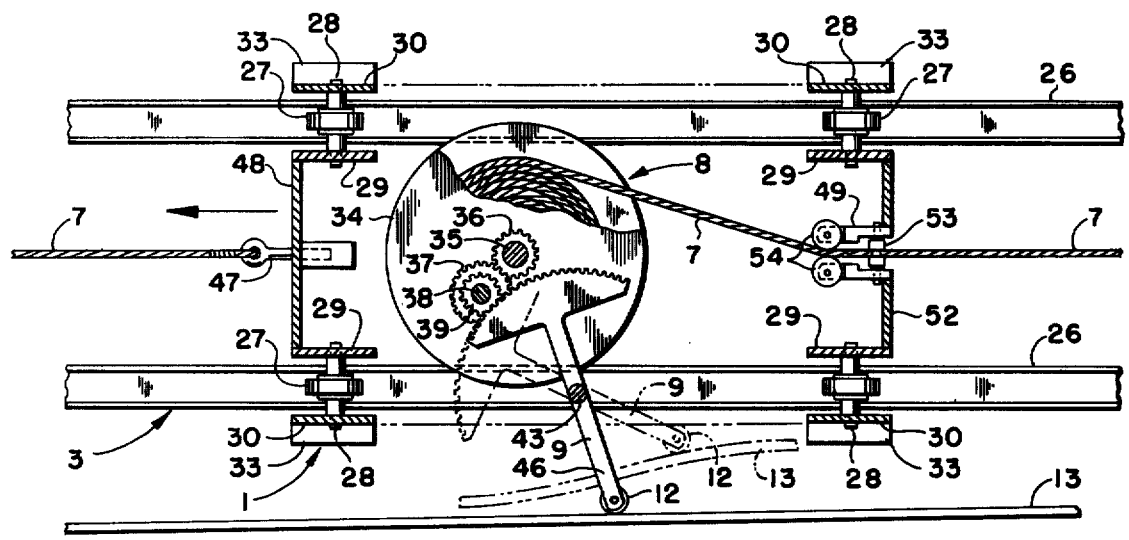
FIG. 7 is a plan view of the take-up mechanism of the vehicle taken along the plane of line 7—7 of FIG. 6 parts being broken away.

Referring to FIGS. 1, 2, 3 and 4 a passenger transportation system is shown in which each vehicle 1 is connected to the next vehicle in an endless train 2 moving along a continuous track 3 which may include a driving means such as high speed belt 4 driven by a motor 5 in driving engagement with a driving pulley 6.

The vehicle 1 is connected to the adjacent vehicle by connecting means such as a flexible wire cable 7 and this cable is pulled into the vehicle or released from the vehicle by a take-up mechanism 8 mounted on the vehicle. The take-up mechanism 8 is actuated by a swingable arm 9 having a cam follower 12 in rolling engagement with an actuating member along the track 3 such as cam rail 13.

As shown in FIGS. 1, 2 and 4 the space between the vehicle 1 and an adjacent vehicle is varied along the track 3 by the take-up mechanisms 8 so that in the high speed zone the vehicle is at the greatest distance from an adjacent vehicle. In the deceleration zone the distance between the vehicle 1 and an adjacent vehicle is reduced and in the load-unload zone the distance is even further reduced reaching the minimum spacing and also the lowest speed of the vehicle alongside a moving platform 14 which is preferably driven at the same speed as the vehicle so that passengers may step from the vehicle directly to the moving platform without stopping the vehicle. In the acceleration zone the distance between the vehicle 1 and an adjacent vehicle is increased reaching the maximum distance at the high speed zone as shown in FIG. 1. With this construction the train 2 has a substantially constant length equal to the length of the track 3. Different speeds, acceleration and deceleration of the vehicle 1 is obtained through varying the distance between vehicles by the take-up mechanism 8. The amount of acceleration and deceleration and speed at the load-unload zone may be changed by adjusting the position of the cam rail 13 along the track.

The track 3 has curved portions 15 and guide pulleys 16 are mounted along the track at the curved portions for rotation about vertical axes to engage the cable 7 so that it extends generally along the track 3 even though the shortest distance between the ends of the cable would extend along a straight line spaced from the track. The guide pulleys 16 are located at the inside portion of the track 3 and close to the track to provide clearance for the vehicle 1 passing over the guide pulleys as shown in FIG. 3.

The moving platform 14 may be a flexible belt extending over supporting pulleys 17 and around terminal pulleys 18 one of which may be a driving pulley. Take-up pulleys 19 may also be provided as shown in FIG. 2.

As shown more clearly in FIGS. 5 and 6 the vehicle 1 has a platform 22 supporting a cab 23 with a sliding door 24 and windows 25 as well as seats (not shown) for passengers.

The track 3 has raised channels 26 on which wheels 27 of the vehicle 1 roll in guided relationship with the track in the grooves of the channels. The wheels 27 are rotatably mounted on shafts 28 mounted on inner brackets 29 and outer brackets 30 fastened to the underside of the platform 22. The outer brackets 30 overhang the channels 26 and the wheels 27 and have flanged feet 33 for engaging the high speed belt 4 as shown in FIG. 4. In the high speed zone the vehicle 1 is supported and driven by the high speed belt 4 through the flanged feet 33. The cable 7 connected to adjacent vehicles not on the high speed belt also drives these vehicles.

The take-up mechanism 8 is mounted on the underside of the platform 22. As shown more clearly in FIG. 7 the cable 7 is wound around a reel 34 mounted on a shaft 35 rotatably mounted in suitable bearings on the underside of platform 22. A gear 36 secured to the shaft 35 is in meshing engagement with an intermediate gear 37 mounted on an intermediate shaft 38 rotatably mounted in suitable bearings on the underside of the platform. A pinion 39 is also mounted on the intermediate shaft 38 for rotation with the shaft and the intermediate gear 37. The swingable arm 9 is pivotally mounted on the underside of platform 22 on a pivot pin 43 and has a curved rack 44 at the inner end 45 in meshing engagement with the pinion 39. At the outer end 46 of the arm 9 the cam follower 12 is rotatably mounted for rolling engagement with the cam rail 13. As shown in dotted lines in FIG. 7 the arm 9 may be swung towards the vehicle 1 by the cam rail 13 for turning the pinion 39, intermediate gear 37 and gear 36 to wind the cable 7 around the reel 34 in a counterclockwise direction.

As shown in FIGS. 6 and 7 the cable 7 of an adjacent vehicle is fastened to the vehicle 1 by an eyebolt 47 connected to a braced transverse member 48 at one end of the vehicle. The cable 7 which is wound around the reel 34 extends through a depressed guide member 49 fastened to a transverse member 52 at the other end of the vehicle 1 and the guide member may have rollers 53 and 54 through which the cable passes so that it will be below the take-up mechanism 8 and at the right level to engage the guide pulleys 16 on the curved portions 15 of the track 3.

In operation of the vehicle 1 on the track 3 the vehicle is supported on the high speed belt 4 in the high speed zone on the flanged feet 33 with the wheels 27 out of engagement with the channels 26. The cam rail 13 is spaced away from the track 3 and vehicle 1 in a position as shown in full lines in FIG. 7 whereupon the cable 7 is unwound from the reel 34 providing the greatest distance between the vehicle 1 and the adjacent vehicle. The entire endless train 2 is propelled by the high speed belt 4 driven by motor 5. As the vehicle 1 moves off the end of the high speed belt 4 the wheels 27 are directed into the channels 26 and the vehicle is guided along the track 3. The cam rail 13 is mounted on the track at a position progressively closer to the vehicle 1 whereupon the arm 9 is swung in a counterclockwise direction as shown in FIG. 7 causing the cable 7 to be wound around the reel 34 and the distance shortened between the vehicle and the adjacent vehicle which results in deceleration of the vehicle. This deceleration continues until the vehicle 1 arrives at the load-unload zone as shown in FIGS. 1 and 2. The vehicle then travels at the same speed as the moving platform 14 in order that passengers may leave or enter the cab 23. Suitable means are provided for automatically opening and closing the sliding door 24 to facilitate movement of the passengers between the cab 23 and the moving platform 14.

After the vehicle 1 leaves the load-unload zone and enters the acceleration zone as shown in FIG. 1 the cam rail 13 is located at a progressively greater distance from the vehicle and the track 3 whereupon the swingable arm 9 is moved in the clockwise direction as shown in FIG. 7 and the cable 7 is unwound from the reel 34 increasing the distance between the vehicle 1 and the adjacent vehicle resulting in acceleration of the vehicle in the portion of the track between the load-unload zone and the high speed zone.

It is understood that the length of the endless train 2 is substantially the same as the length of the track 3 and therefore any adjustments to the cam rail 13 to provide for greater acceleration in one portion of the track must be compensated for by adjustments in another portion of the track to provide for greater deceleration. Releasing the cable 7 from one vehicle in one portion of the train 2 is compensated for by the take-up of cable 7 by another vehicle in the train. The cable 7 is preferably of wire rope and as such has resiliency to absorb sudden start up and operational forces exerted on the system.

Figure 8:
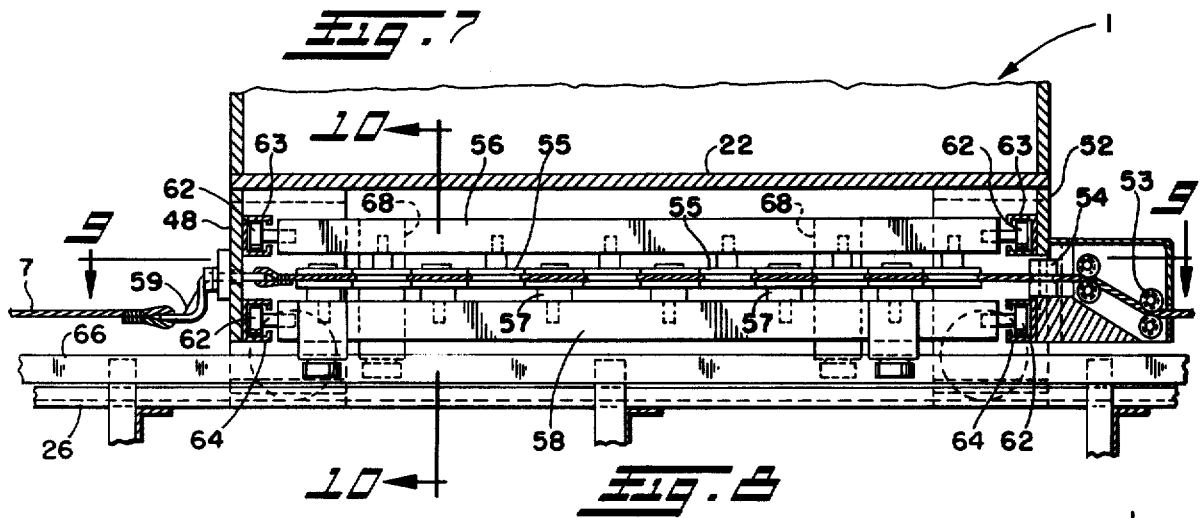
FIG. 8 is a sectional side elevational view like FIG. 6 showing a modified take-up mechanism parts being broken away.
Figure 9:
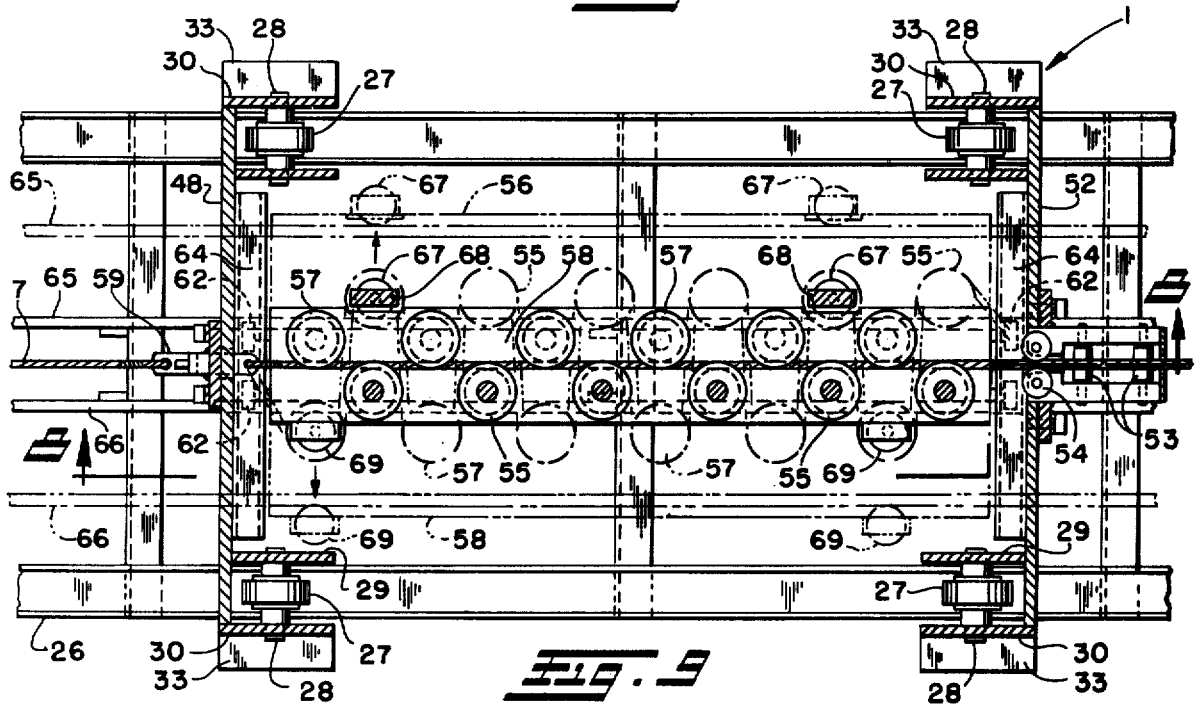
FIG. 9 is a plan view like FIG. 7 showing the take-up mechanism of the modification shown in FIG. 8.
Figure 10:
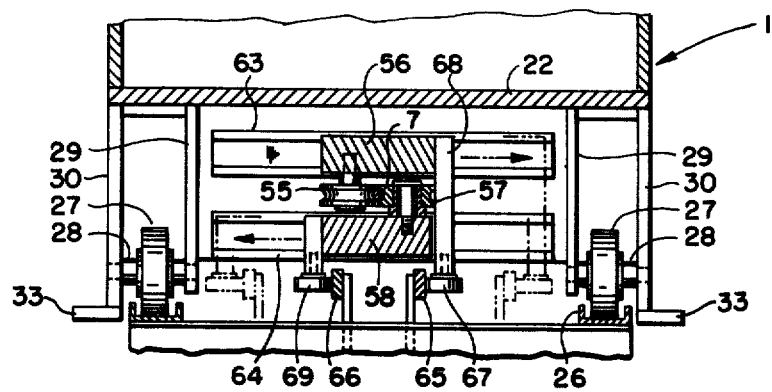
FIG. 10 is a sectional view of the modification of FIG. 8 taken along the plane of line 10—10 of FIG. 8.

Referring to FIGS. 8, 9 and 10 a modification of take-up mechanism 8 is illustrated which may also be mounted on the underside of the vehicle 1. In this embodiment the cable 7 extends through an opening in the transverse member 52 at one end of the vehicle 1 and passes between a series of upper pulleys 55 mounted on an upper beam 56 and a series of lower pulleys 57 mounted on a lower beam 58 with the ends of the cable fastened to an eyebolt 59 mounted on the transverse member 48. The upper beam 56 and the lower beam 58 have rollers 62 at the ends which are contained in transverse trackways 63 and 64 respectively mounted on the transverse members 48 and 52 at the ends of the vehicle 1 to provide for movement of the upper beam and lower beam from the positions shown in full lines in FIG. 9 to the positions indicated in dotted lines in FIG. 9 to take up the cable 7 and reduce the distance between the vehicle 1 and an adjacent vehicle.

Beneath the vehicle 1 and between the channels 26 of the track 3 cam rails 65 and 66 are mounted along the track. Cam followers 67 for the upper beam 56 are mounted on vertical members 68 fastened to the edge of the upper beam 56 for engagement with the cam rail 65 to move the upper beam from the position shown in FIG. 10 to the right or as shown in FIG. 9 downward as the cam rail 66 is moved from the position shown in full lines in FIG. 9 to the position shown in dotted lines. In the same manner cam followers 69 are mounted on the lower beam 58 for engagement with the cam rail 66 for movement of the lower beam from the position shown in full lines in FIG. 9 upward to the position shown in dotted lines with the cam followers 69 in engagement with the cam rail 66. It can therefore be seen that as the cam rails 65 and 66 are located at positions outwardly from the center of the track 3 the lower beam 58 and upper beam 56 are moved laterally outward and spread the upper pulleys 55 and lower pulleys 57 laterally changing the path of the cable 7 from that shown in full lines in FIG. 9 to that shown in dotted lines.

In operation the cam rails 65 and 66 may be discontinued at the high speed zone where the vehicle 1 is driven on the high speed belt 4. In this condition the upper pulleys 55 and lower pulleys 57 assume the position shown in FIG. 9 in full lines and the cable 7 is extended to the fullest extent between the vehicle 1 and an adjacent vehicle. As the vehicle 1 is pushed off the end of the high speed belt 4 and the wheels 27 roll into the channels 26 the cam rails 65 and 66 may be continued in the position between the cam followers 67 and 69. In the deceleration zone the cam rails 65 and 66 are spread which urges the cam followers 67 and 69 laterally outward carrying the upper pulleys 55 and lower pulleys 57 laterally outward increasing the path of the cable 7 under the vehicle 1 and decreasing the distance between the vehicle and an adjacent vehicle. This progressive take-up of the cable is continued by further spreading of the cam rails 65 and 66 throughout the deceleration zone and up to the load and unload zone where the vehicles 1 are driven at the same speed as the moving platform 14.

As the vehicle 1 leaves the load-unload zone the cam rails 65 and 66 are progressively located in positions closer together and accordingly the upper pulleys 55 and lower pulleys 57 are brought laterally inward towards the center of the vehicle 1 releasing the cable 7 from the vehicle and increasing the distance between the vehicle and an adjacent vehicle whereby acceleration of the vehicle is obtained. This converging of the cam rails 65 and 66 progressively releases further amounts of the cable 7 accelerating the vehicle 1 to a point where the vehicle reaches the same speed as the high speed belt 4 and is propelled on to the high speed belt at which point the cam rails may be discontinued.

Figure 11:
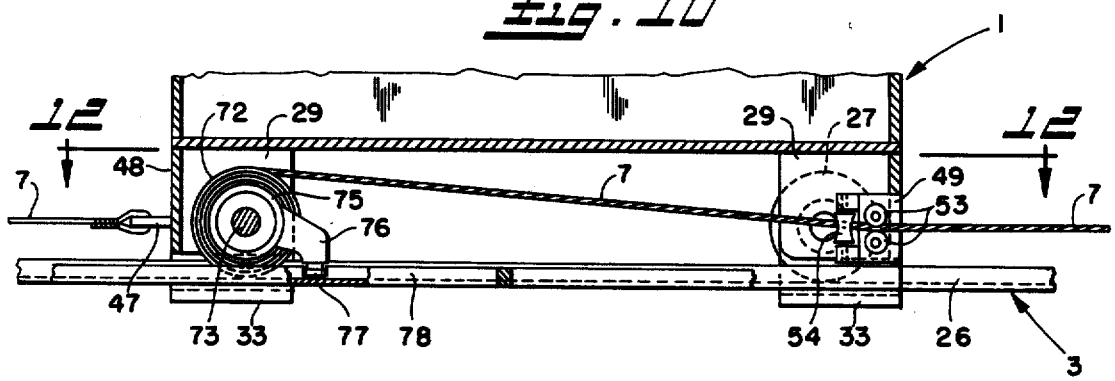
FIG. 11 is a sectional view like FIG. 6 of a further modification of the invention showing the take-up mechanism mounted on the vehicle with parts being broken away.
Figure 12:
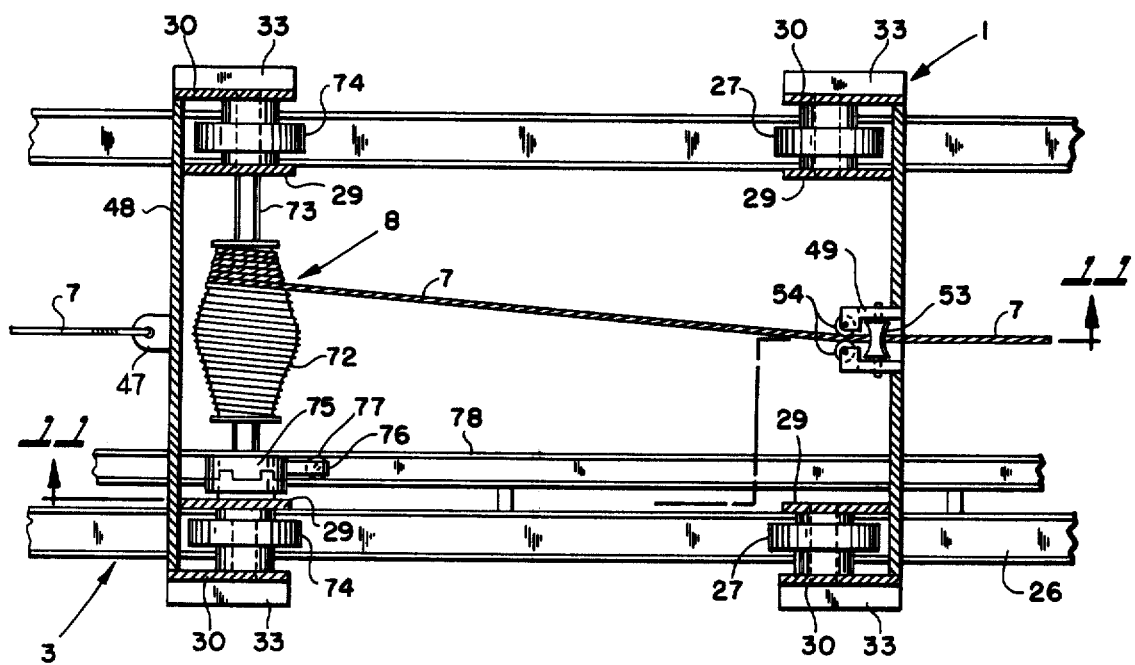
FIG. 12 is a plan view of the take-up mechanism shown in FIG. 11 taken along the plane of line 12—12 of FIG. 11.

A further modification of the invention is shown in FIGS. 11 and 12 in which the take-up mechanism 8 includes a cone drum 72 mounted on a shaft 73 driven by the front wheels 74. The cone drum 72 is connected to the shaft 73 through a clutch 75 having an arm 76 carrying a cam follower 77 adjacent the track 3 of the system. A cam rail 78 extends along the track 3 for engagement by the cam follower 77.

In operation the cam rail 78 is located at positions laterally of the track 3 to move the cam follower 77 towards the center of the vehicle or away from the center to disengage and engage the clutch 75. It can be seen that upon engagement of the clutch 75 the cable 7 will be wrapped around the cone drum 72 at a progressively greater rate as the diameter of the grooves receiving the cable increase whereby the distance between the vehicle 1 and an adjacent vehicle is reduced and deceleration of the vehicle is provided. Conversely when the clutch 75 is disengaged the cable 7 will be released from the cone drum 72 increasing the distance between the vehicle and an adjacent vehicle to provide acceleration of the vehicle.

In this modification as in the other modification and the preferred embodiment of the invention the cable 7 is released from one vehicle in the train at the same rate that the cable 7 is taken up by another vehicle so that the length of the train 2 is substantially constant even though the vehicle 1 is accelerated, decelerated and driven at different speeds. While certain representative embodiments and details have been shown for the purpose of illustrating the invention it will be apparent to those skilled in the art that various changes and other modifications may be made therein without departing from the spirit or scope of the invention.

We claim:

1. A variable speed vehicle for an endless train driven along a continuous track, a flexible elongated member between said variable speed vehicle and an adjacent vehicle of said train, and a rotatable reel mounted on said variable speed vehicle and responsive to actuation from said track for winding and unwinding of said elongated member to change the length of said elongated member between said variable speed vehicle and said adjacent vehicle, said reel reducing the length of said connecting means between said variable speed vehicle and said adjacent vehicle by pulling said variable speed vehicle and said adjacent vehicle closer together and said reel increasing the length of said connecting means by permitting said variable speed vehicle and said adjacent vehicle to be pulled further apart whereby acceleration, deceleration and different speeds of said variable speed vehicle can be obtained at predetermined portions of the track.

2. A variable speed vehicle according to claim 1 wherein said take-up means includes a swingable arm for engagement with an actuating member on said track for controlling rotation of said reel.

3. A variable speed vehicle according to claim 2 wherein said reel has a gear in driven connection with a gear turned by movement of said swingable arm and said actuating member is a cam rail for rolling engagement with a cam follower mounted on said arm whereby said elongated member is taken up and released from said reel in response to movement of said cam follower on said cam rail.

4. A variable speed vehicle according to claim 2 wherein said variable speed vehicle has a driven wheel rotatable along said track, said reel being rotatably engageable with said driven wheel and said swingable arm being connected to move said reel into and out of driving engagement with said driven wheel in response to engagement of said arm with said actuating member.

5. A variable speed vehicle according to claim 4 wherein said reel further comprises a cone drum whereby the rate said elongated member is wound on said drum is variable to vary the rate of change in the length of said elongated member between said variable speed vehicle and said adjacent vehicle.

6. A variable speed vehicle according to claim 1 wherein said track has a curved portion with guide pulleys rotatable about vertical axes and disposed at spaced-apart positions along said curved portion, said variable speed vehicle having a guide member underneath the vehicle through which said elongated member is directed so as to pass around said guide pulleys and be maintained in a position substantially over said curved portion of said track.

7. A variable speed vehicle according to claim 6 wherein said guide member is spaced laterally from said guide pulleys along said track to provide for laying said elongated member in the same plane as said pulleys and maintain clearance when said variable speed vehicle passes by said pulleys.

* * * * *